United States Patent [19]
Barkan et al.

[11] Patent Number: 5,278,397
[45] Date of Patent: Jan. 11, 1994

[54] MULTI-RESOLUTION BAR CODE READER

[75] Inventors: Edward Barkan, South Setauket; David P. Goren, Ronkonkoma; Joseph Katz, Stony Brook; Yajun Li, Holtsville; Jerome Swartz, Old Field; Thomas Mazz, Huntington Station, all of N.Y.

[73] Assignee: Symbol Technologies, Inc., Bohemia, N.Y.

[21] Appl. No.: 735,573

[22] Filed: Jul. 25, 1991

[51] Int. Cl.[5] .............................................. G06K 7/10
[52] U.S. Cl. ..................................... 235/462; 235/472
[58] Field of Search .................................. 235/472, 462

[56] References Cited

U.S. PATENT DOCUMENTS

| | | | |
|---|---|---|---|
| 3,684,868 | 8/1972 | Christie et al. | 250/219 |
| 3,716,699 | 2/1973 | Eckert et al. | 235/463 |
| 3,727,030 | 4/1973 | McMurtry | 250/219 |
| 3,758,782 | 9/1973 | Radford et al. | 250/239 |
| 3,784,794 | 1/1974 | Allais . | |
| 3,809,893 | 5/1974 | Dobras | 250/227 |
| 3,916,184 | 10/1975 | Turner et al. | 250/227 |
| 4,013,893 | 3/1977 | Hertig | 250/568 |
| 4,115,703 | 9/1978 | Dobras | 250/568 |
| 4,143,809 | 3/1979 | Uebbing et al. | 235/462 |
| 4,675,531 | 6/1987 | Clark et al. | 250/568 |
| 4,831,275 | 5/1989 | Drucker | 235/472 |
| 4,963,756 | 10/1990 | Quan et al. | 235/472 |
| 5,051,567 | 9/1991 | Tedesco | 235/462 |
| 5,122,644 | 6/1992 | Hasegawa et al. | 235/472 |
| 5,136,147 | 8/1992 | Metlitsky et al. | 235/472 |
| 5,140,142 | 8/1992 | Atsushi | 235/472 |

OTHER PUBLICATIONS

Metlitsky, B., *Laser Bar Code Scanning: A System Design and Analysis Model*, Symbol Technologies publication, Jul. 1990.
Bar Code System considerations, Symbol Technologies, Inc. publication dated Dec. 1989.
"SFH 204 Silicon Four Quadrant Photodiode," Siemens publication (undated), pp. 8-44 and 8-45.
"PBX 48 Differential Photodiode," Siemens publication (undated), pp. 8-20 and 8-21.
Symbol Technologies, Inc., "SDT: New Scanning Data Terminal-Supports Both Bar Code Reading and Manual Data Entry," *Symbol MSI*, Part 789 MX, 1989.

*Primary Examiner*—John Shepperd

[57] ABSTRACT

The method and apparatus of this invention facilitate operation of a bar code reader over a wider range of working angle and for a wider range of bar code densities. The invention includes improved optics and sensing elements. The optics and sensing elements and/or the associated circuitry are arranged to provide two channels of data derived form the scanned bar code. The two channels have differing resolutions. Analysis of the data from the two channels provides a single decoded result. As the working angle and density vary at least one of the resolutions will be appropriate for sensing all or most of the bar coded data. The data from the channel producing a valid result can be used, or if neither channel produces a valid result by itself, data from each channel can be analyzed and valid portions of the data from both channels combined to produce the single decoded result.

43 Claims, 12 Drawing Sheets

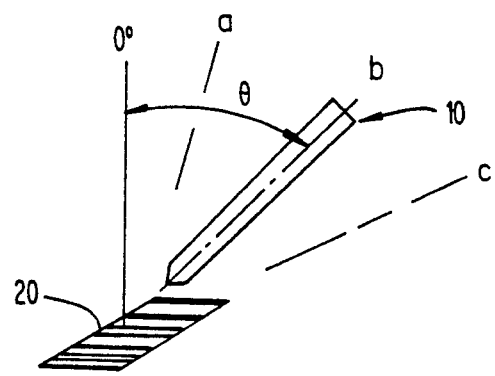
Figure 1
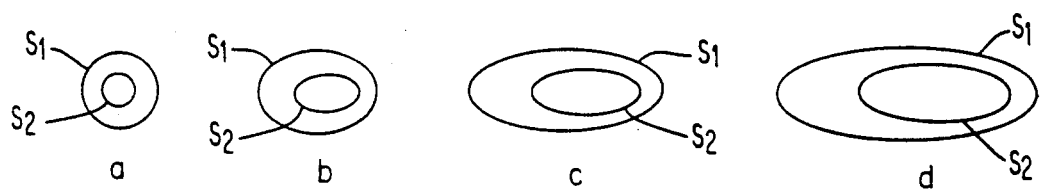
Figure 2
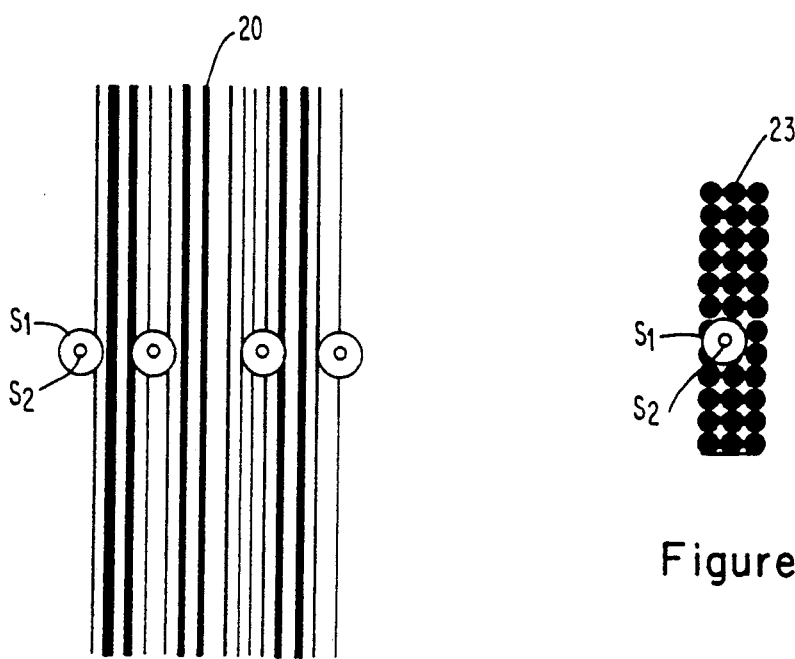
Figure 3A
Figure 3B

MULTI-RESOLUTION BAR CODE READER

TECHNICAL FIELD

The instant invention relates to an improved wand or scanner for reading optically encoded information, particularly bar coded data.

BACKGROUND ART

Optically encoded information, such as bar codes, have become quite common. A bar code symbol consists of a series of light and dark regions, typically in the form of rectangles. The widths of the dark regions, the bars, and/or the widths of the light spaces between the bars indicates the encoded information. A specified number and arrangement of these elements represents a character. Standardized encoding schemes specify the arrangements for each character, the acceptable widths and spacings of the elements the number of characters a symbol may contain or whether symbol length is variable, etc.

To decode a bar code symbol and extract a legitimate message, a bar code reader scans the symbol to produce an analog electrical signal representative of the scanned symbol. A variety of scanning devices are known. The scanner could be a wand type reader including an emitter and a detector fixedly mounted in the wand, in which case the user manually moves the wand across the symbol. Alternatively, an optical scanner scans a light beam such as a laser beam across the symbol, and a detector senses the light reflected from the symbol. In either case, the detector senses reflected light from a spot scanned across the symbol, and the detector provides the analog scan signal representing the encoded information.

A digitizer processes the analog signal to produce a pulse signal where the widths and spacings between the pulses correspond to the widths of the bars and the spacings between the bars. The digitizer serves as an edge detector or wave shaper circuit, and the threshold value set by the digitizer determines what points of the analog signal represent bar edges. The threshold level effectively defines what portions of a signal the reader will recognize as a bar or a space.

Readers of the type discussed above are single channel systems having a single digitizer output and/or a single processing chain to produce a single digitized output.

The pulse signal from the digitizer is applied to a decoder. The decoder first determines the pulse widths and spacings of the signal from the digitizer. The decoder then analyzes the widths and spacings to find and decode a legitimate bar code message. This includes analysis to recognize legitimate characters and sequences, as defined by the appropriate code standard. This may also include an initial recognition of the particular standard the scanned symbol conforms to. This recognition of the standard is typically referred to as autodiscrimination.

Different bar codes have different information densities and contain a different number of elements in a given area representing different amounts of encoded data. The denser the code, the smaller the elements and spacings. Printing of the denser symbols on a appropriate medium is exacting and thus is more expensive than printing low resolution symbols.

A bar code reader typically will have a specified resolution, often expressed by the size of its effective sensing spot. The resolution of the reader is established by parameters of emitter or the detector, by lenses or apertures associated with either the emitter or the detector, by the threshold level of the digitizer, by programming in the decoder, or by a combination of two or more of these elements.

In a laser beam scanner the effective sensing spot may correspond to the size of the beam at the point it impinges on the bar code. In a wand using an LED or the like, the spot size can be the illuminated area, or the spot size can be that portion of the illuminated area from which the detector effectively senses light reflections. By what ever means the spot size is set for a particular reader, the photodetector will effectively average the light detected over the area of the sensing spot.

In one prior art example, U.S. Pat. No. 4,675,531 to Clark et al., an LED illuminates the bar code and images the code onto a photodetector. The aperture of the photodetector determines the resolution or "spot size". In the Clarke et al. system the photodetector effectively averages the light detected over the area of the aperture.

A high resolution reader has a small spot size and can decode high density symbols. The high resolution reader, however, may have trouble accurately reading low density symbols because of the lower quality printing used for such symbols. This is particularly true of dot matrix type printed symbols. The high resolution reader may actually sense dot widths within a bar as individual bar elements. In contrast, a low resolution reader has a large spot size and can decode low density symbols. However, a reader for relatively noisy symbols such as dot matrix symbols reads such a wide spot that two or more fine bars of a high resolution symbol may be within the spot at the same time. Consequently, a reader having a low resolution, compatible with dot matrix symbols can not accurately read high density symbols. Thus any reader having a fixed resolution will be capable of reading bar codes only within a limited range of symbol densities.

For a given symbol density, the resolution of the reader also limits the range of the working angle, i.e. the angle between the axis of the reader and a line normal to of the surface on which the bar code is printed. If the range and resolution are too limited, a user may have difficulty holding the reader, particularly a wand type reader, comfortably while accurately scanning the bar code. This can be particularly troublesome if the wand incorporates additional elements to form an integrated data terminal. The combination of size, weight and an uncomfortable angle can make reading in large amounts of bar code information difficult and annoying, and thereby make the user more resistant to use of the bar code system.

One solution might be to provide some means to adjust the resolution or sensing spot size of the reader, e.g., by adjusting the threshold of the digitizer. This approach, however, would require a number of different scans at different resolutions. If the scan is automatic, the variation in resolution causes a loss of robustness because the scan is at the correct resolution only a reduced amount of the time. Effectively such a scanner would scan at the equivalent of a reduced rate. If the reader is a wand type device, the user would have to manually scan the reader across the information each time the resolution changes. This causes a marked reduction in the first read rate and increased frustration for the user.

Clearly a need exists in the art for a high performance bar code reader which can operate at a wide range of working angles and is capable of reading bar codes over a wide range of symbol densities.

DISCLOSURE OF THE INVENTION

Objectives

The objective of this invention is to provide a high performance bar code reader which is more convenient and efficient to use, particularly by relatively unskilled operators.

A more specific objective of this invention is to derive a larger amount of information from a each pass or scan by a single bar code scanner or reader.

More specifically, an objective of the invention is to use the additional information derived from the single scan to obtain an accurate read by the wand for a wider range of working angles between the wand and a perpendicular to the surface on which the bar code is printed and a wider range of distances from the wand to the printed bar code. The wider working angle range allows the unskilled operator to scan the code at whatever angle is most convenient and comfortable yet still obtain a high percentage of successful first reads. The ease of operation this feature provides becomes particularly important when the wand reader incorporates additional elements to form an integrated terminal for processing, storing and displaying the scanned bar code data and data entered by operation of a built in keyboard.

Another objective of the invention is to use the additional information derived form the scan to read bar codes of a wider range of optical code densities without requiring multiple scans of the information. This allows one improved reader to replace two or more readers previously required, each of which was necessarily designed to read bar codes of a restricted range of bar code density. For a user of relatively low skill this eliminates problems and frustrations of selecting a reader and/or adjusting the sensitivity of the reader to match the density of the particular code the user wants to scan.

Summary

To operate over a wider range of working angle, the invention detects optically encoded information using two effective sensing spots of different diameter. As the angle varies one spot should be sufficiently in focus to provide a valid read, and even if neither is sufficient, information from both spots can often be combined to accurately decode the information.

To read a wider range of bar code resolutions, the reader includes two reading channels and derives a single valid decoded result from the scanning data of the two channels. Typically, one channel will have a resolution corresponding to the density of the currently scanned bar code, but if not, valid portions of data from each channel can be combined to provide a single accurate decode result.

In a first aspect, the invention encompasses a method of increasing a range of a working angle of a wand type reader during reading of optically encoded information. The working angle is the angle between a major axis of the wand type reader and a perpendicular of a surface on which the optically encoded information appears. The method includes the step of arranging light emitting and detecting elements to (i) optically sense light reflected from a first effective sensing spot of a first diameter, and to (ii) optically sense light reflected from a second effective sensing spot of a second diameter which is larger than the first diameter. The first and second effective sensing spots are passed over the optically encoded information. This produces (i) a sensing of the optically encoded information as it passes through the first effective sensing spot to produce a first sensing signal, and (ii) a sensing of the optically encoded information as it passes through the second effective sensing spot to produce a second sensing signal. The diameters of the first and second effective sensing spots increase in proportion to increases in the working angle. The method further includes the step of deriving a single decoded representation of the optically encoded information from the two sensing signals. For different working angles, at least one of the effective sensing spots will be of appropriate size to produce a valid reading of the optically encoded information.

In a second aspect, the invention encompasses an apparatus which corresponds closely to the above discussed method. Specifically, this aspect of the invention is a wand type reader for reading optically encoded information at a wide range of a working angle. The wand type reader includes light emitting and detecting elements arranged in the wand to optically sense light reflected from a first effective sensing spot of a first diameter, for sensing the optically encoded information as it passes through the first effective sensing spot and in response thereto for producing a first sensing signal. The emitting and detecting elements are also arranged to optically sense light reflected from a second effective sensing spot of a second diameter which is larger than the first diameter, for sensing the optically encoded information as it passes through the second effective sensing spot and in response thereto for producing a second sensing signal. The diameters of the first and second effective sensing spots increase in proportion to increases in the working angle. The wand type reader also includes means for deriving a single decoded representation of the optically encoded information from the two sensing signals. As a result, for different working angles at least one of the effective sensing spots will be of appropriate size to produce a valid reading of the optically encoded information.

In another aspect, the invention is a method of reading optically encoded information. This method includes optically exposing encoded information and sensing light reflected from the optically encoded information to produce two data streams, each related to the optically encoded information. The two data streams have different resolutions. The method derives a single decoded representation of the optically encoded information from the two data streams.

In another apparatus aspect, the invention is a system for reading optically encoded information. This system includes a sensor means, i.e. at least one sensor, for optically sensing the encoded information to produce at least one electrical signal corresponding to the sensed optically encoded information. Means are provided for deriving two channels of data for each scan or pass of the encoded information by the sensor in response to the at least one electrical signal. The two data streams again have different resolutions. A decoder responds to both channels of derived data to provide a single data output representative of the sensed optically encoded information.

The instant invention also includes an improved optical sensing assembly. The optical sensing assembly includes a first and a second light emitter, emitting light along a first and a second optical axis, respectively. An optical sensing element is provided for detecting reflected light from the first and second light emitters. The optical sensing element receives the reflected light along a third optical axis parallel to the first and second optical axes. The assembly also includes first and second half-axicon optical elements with spherical interfaces in the rear which are aligned with the emitters along the first and second optical axes, respectively. The first half-axicon optical element establishes depth of field and spot size for light emitted by the first light emitter and received by the optical sensing element. Similarly, the second half-axicon optical element establishes depth of field and spot size for light emitted by the second light emitter and received by the optical sensing element. The two half-axicons can be identical or different. For two identical half-axicons, one obtains a field depth and a rather symmetrical spot size. For the case of two different half-axicons, each of these two establishes a different depth of field and a spot size.

The instant invention also includes an improved photodetector. In this aspect, the invention is a multi-channel photodetector which includes two active optical sensing areas formed on a single substrate. The second active optical sensing area is located around the first optical sensing area.

The invention encompasses a number of systems for deriving the two sensing spots and or the two channels of data having differing resolution. For example, in the simplest embodiment, a wand type reader includes an LED light source and a single photodiode type detector. The detector signal passes through two different signal conditioning circuits and associated digitizers. One signal conditioning circuit and associated digitizer provide a high resolution output, and the other signal conditioning circuit and associated digitizer produce a low resolution output. A microprocessor analyzes the digital data from both channels to decode the scanned bar coded data. The two resolution channels allow reading of dense high resolution bar codes and low resolution bar codes such as those produced by dot matrix printers, with a single pass or scan of a single bar code reader.

It is also possible to use one light source and two detectors. The characteristics of the two detectors and/or their associated optics differ to provide the required two different resolutions. In one particularly advantageous embodiment, each of the two detectors or sensors is a photodiode, and the two photodiodes are formed as a single concentric structure. One of the photodiodes is formed in the center, and the second of the photodiodes surround the first. An analog to digital converter digitizes a signal output by the central photodiode to form the higher resolution data channel. The signal output of the first photodiode and a signal output of the second photodiode are summed, and a second analog to digital converter digitizes the summed signals to form the lower resolution data channel.

Another approach is to provide two different optical emitters and two detectors, each emitter-detector pair providing one channel of scanning information. The resolution of each channel is set by one or more of the optical components, i.e. by the design of the emitter, the design of the detector or an aperture associated with the emitter-detector pair.

Whichever system is used to derive the two channels, the microprocessor can analyze the data from each channel, recognize which produces a valid decode result and select the resultant data derived from that channel as the output data. The channel whose resolution does not match the density of the bar code currently being read would produce a recognizable read error.

Alternatively, the microprocessor can merge the data from the two channels to produce a single valid result, even if neither of the two separate channels would alone produce a valid read. The microprocessor recognizes which portions of the read data from each channel are within acceptable parameters for a read operation of the corresponding resolution. The microprocessor discards any data from the two channels which appears outside the acceptable limits. The microprocessor combines the acceptable portions of the data from the two channels to form the single final valid read result.

A high performance bar code wand should have the following features:
  Built-in decoder.
  Autodiscrimination of the most popular symbologies.
  Large resolution range (from low to high density bar codes, namely 5~20 mil, from well-printed to dot-matrix bar codes).
  Easily read over plastic or lamination.

The above technical requirements can be satisfied when the emitter-detector module has a higher depth of field and a variable spot size. For instance, to read over plastic or lamination, a 2 mm depth of field is usually necessary, and to read dot-matrix bar codes, the required spot size may be as large as 0.5 mm.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

FIG. 1 is an isometric illustration of a wand type bar code reader embodying the invention during scanning of a bar code.

FIG. 2 shows the two effective sensing spots for different working angles of the wand illustrated in FIG. 1.

FIGS. 3A and 3B illustrate scanning of the sensing spots across bar codes. FIG. 3A shows the two effective sensing spots of the invention as they pass over an entire bar code symbol of relatively high density. FIG. 3B shows the two effective sensing spots as they pass over a single bar code element of a low density dot matrix type symbol.

FIG. 14 shows circular areas and a connection to the central area via an insulating channel through the surrounding active area. FIG. 15 shows rectangular areas and use of a bonding pad on the central area with a lead passing above the surrounding active area.

Figure 4A:
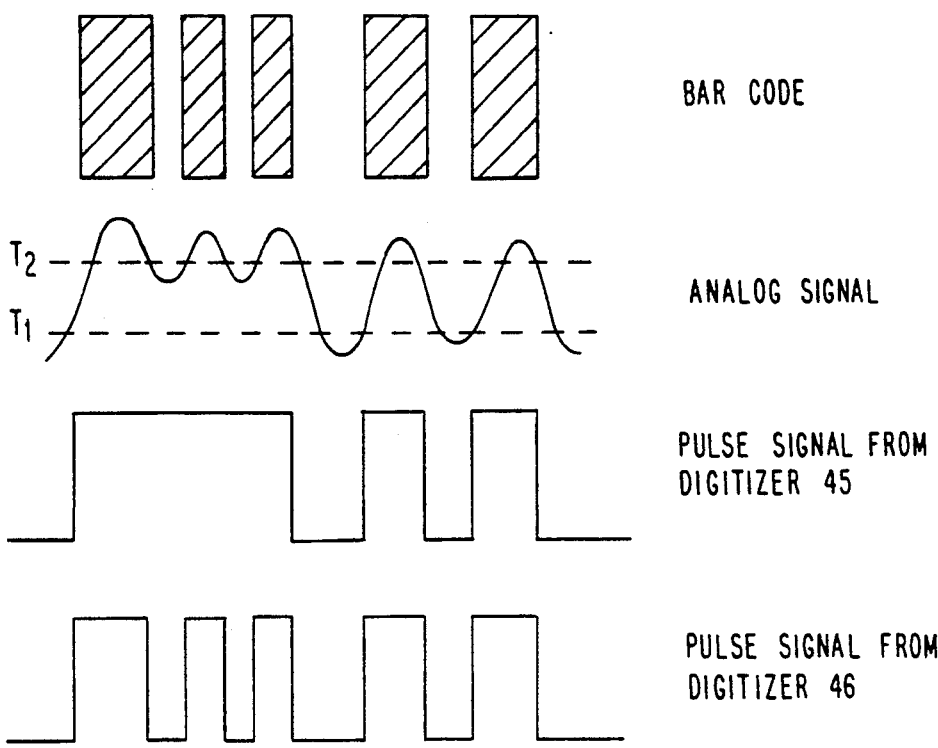
FIG. 4A shows a high resolution bar code and the signals produced in the circuit of FIG. 4 by scanning of such a bar code.

Best Mode for Carrying out the Invention

FIGS. 1 and 2 illustrate scanning of a bar code and how the invention serves to increase the range of a working angle $\theta$, particularly for a wand type reader. FIG. 1 shows a wand type bar code reader 10 being manually scanned across bar code 20. As shown in FIG. 1, the working angle $\theta$ is defined as the angle between the major axis of the wand 10 and a line normal to the surface on which the optically encoded information appears. The wand 10 is shown in position b, at which point the angle $\theta$ is approximately 45°. The wand, however, can be held at a wide range of angles, such as at the 0° position or at positions a and c as illustrated in FIG. 1.

The light emitting and detecting elements of the wand 10 are arranged to produce two effective sensing spots $S_1$ and $S_2$, of differing diameters. FIG. 2 shows the different diameters and shapes of the two sensing spots for the different working angles, $\theta$. At the 0° position, both of the sensing spots $S_1$ and $S_2$ are essentially concentric circles. As the angle $\theta$ increases through positions a, b and c, however, the two spots $S_1$ and $S_2$ smear and enlarge to form progressively larger ovals.

If the reader is a wand type device, the user manually moves the wand to scan the two sensing spots across the bar code. This produces (i) a sensing of the optically encoded information as it passes through the first effective sensing spot to produce a first sensing signal, and (ii) a sensing of the optically encoded information as it passes through the second effective sensing spot to produce a second sensing signal.

During a scan of a bar code or other optically encoded information, the first and second sensing spots $S_1$ and $S_2$ are scanned over the optically encoded information. FIG. 3A shows scanning of the spots $S_1$ and $S_2$ across a bar code 20, for a relatively small working angle $\theta$. The user keeps the working angle close to or equal to 0° throughout the length of the scan, and the spots $S_1$ and $S_2$ both remain essentially circular.

If the user changes the working angle, the sizes and shapes of the sensing spots $S_1$ and $S_2$ change in the manner illustrated in FIG. 2. The diameters of the first and second effective sensing spots $S_1$ and $S_2$ increase in proportion to increases in the working angle. The invention derives a single decoded representation of the optically encoded information from the sensing signals derived from scanning the two sensing spots $S_1$ and $S_2$ over the information. For different working angles, at least one of the effective sensing spots will be of appropriate size to produce a valid reading of the optically encoded information.

For a relatively low density code, the 0° working angle may provide a large circular sensing spot $S_1$, as shown at a in FIG. 2, of the appropriate size. The smaller spot $S_2$ may actually be too small for some noisy printed codes, such as dot matrix printed codes. At a slightly larger angle, such as at b, both may provide at least some readable information, which can be merged to provide a single legitimate decode result. As the working angle $\theta$ increases, the spots $S_1$ and $S_2$ elongate, and at a number of the angles, although large spot $S_1$ becomes too large, the smaller spot $S_2$ will have an appropriate diameter.

FIG. 3A shows scanning of the spots $S_1$ and $S_2$ across a relatively high density bar code 20. Because the working angle is close or equal to 0°, the spots $S_1$ and $S_2$ are both essentially circular. At several points of the scan of the high density bar code, particularly at the middle two positions illustrated in the drawing, the larger sensing spot $S_1$ covers two or more elements. The averaging over such an area would not provide an accurate signal indicating the edges of the small bar code elements. The smaller diameter spot $S_2$, however, covers so small an area that even at these positions it covers only one narrow element.

FIG. 3B illustrates scanning of the spots $S_1$ and $S_2$ over one element 23 of a dot matrix bar code. As shown, the element 23 actually exhibits gaps between the individual dots. Sensing using the small spot $S_2$ will detect the dots as dark areas and the gaps as light regions. For example, at the position shown in FIG. 3B, the spot $S_2$ coincides approximately with one of the gaps. As a result, the signal responsive to sensing of spot $S_2$ would, at that point indicate a light space, not a dark bar element. Thus sensing of the spot $S_2$ would not accurately read the width of the element 23. The larger spot $S_1$, however, should produce a legitimate decode result. Sensing using spot $S_1$ averages the reflected light over the larger area of that spot, and consequently would indicate a dark element.

Figure 4B:
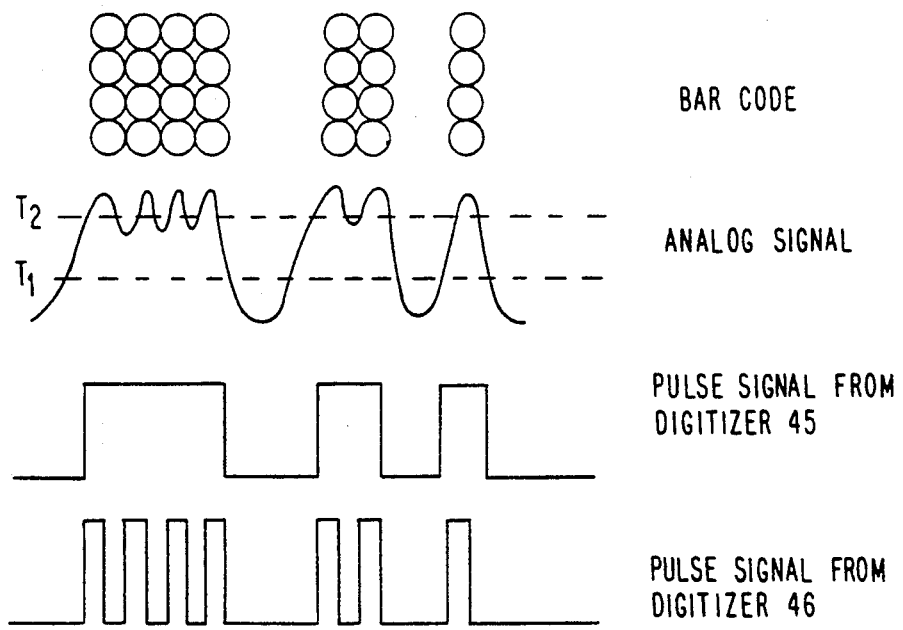
FIG. 4B shows a noisy bar code printed by a dot matrix printer and the signals produced in the circuit of FIG. 4 by scanning of such a bar code.
Figure 4:
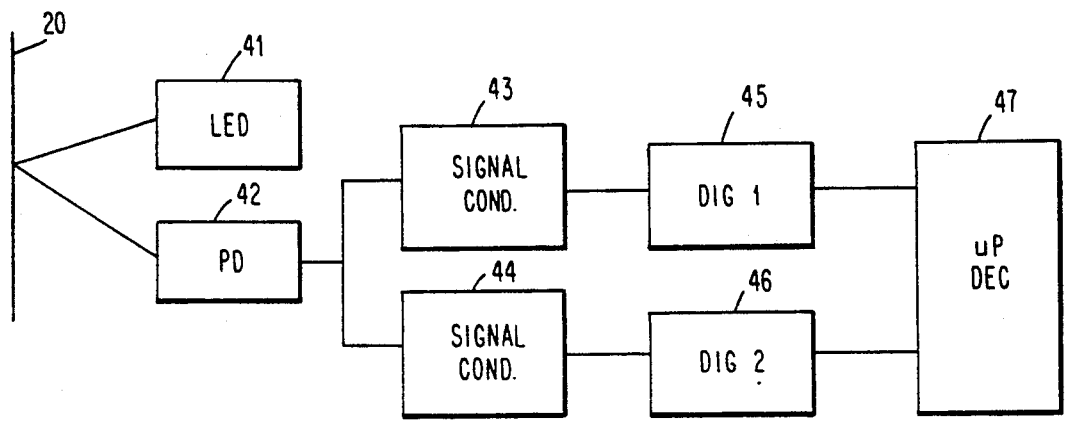
FIG. 4 is a block circuit diagram of one embodiment of the invention which uses different resolution digitizers.

FIG. 4 shows the first embodiment of the invention, which is the simplest technique for producing the two channels having two different resolutions or sensing spots. This embodiment derives the two different resolutions electronically, by using digitizers having different resolutions. The reader could be an automatic scanner or a wand type device which requires manual scanning. For simplicity the discussion of the circuitry will assume that the reader is a manual scanning type wand.

The embodiment of FIG. 4 has a single light source, light emitting diode or "LED" 41, and a single photodetector, photodiode "PD" 42. The LED 41 emits light to illuminate an area of the surface of the optically encoded information, i.e. bar code 20. The PD 42 senses light reflected from bar code 20 and produces an analog signal the amplitude of which represents the amplitude of reflected light. The reader scans the bar code. If the reader is a wand type unit, the user manually passes the unit over the information such that the detected reflected light varies in amplitude in correspondence with the light and dark regions of the information.

The analog signal from PD 42 is amplified, inverted and conditioned by two analog signal conditioning circuits 43 and 44. The signal conditioning circuits 43 and 44 are essentially identical and thus provide two analog signals output signals. One of these output signals goes to a first digitizer 45, the other to second digitizer 46. The digitizers 45 and 46 serve as edge detectors or wave shaper circuits, in a manner similar to digitizers used in prior art single channel type readers. In each of the digitizers 45 and 46, and the threshold value set by the digitizer determines what points of the analog signal represent bar edges. The digitizers 45 and 46, however, have different threshold values.

The pulse signals output from both of the digitizers 45 and 46 are supplied as inputs to a programmed microprocessor type decoder 47. Signal conditioning circuit 43 and digitizer 45 form a first channel providing a first data stream to the decoder 47. Signal conditioning circuit 44 and digitizer 46 form a second channel providing a second data stream to the decoder 47. The threshold of the first digitizer 43 is set relatively low, at $T_1$ as shown in FIGS. 4A and 4B, so that digitizer 43 will have a low resolution. The second digitizer 46 has a high threshold $T_2$ and is sensitive.

FIG. 4A shows a high resolution bar code and the signals produced in the circuit of FIG. 4 by scanning of such a bar code. The analog signal varies with the averaging of the reflected light, and as conditioned, will have small fluctuations corresponding to closely spaced bars. The low threshold in the first digitizer 45 will cause several of the variations to go undetected, as shown by the pulse signal from digitizer 45, in FIG. 4A. The second channel, with its high resolution, will detect small variations in the reflected light caused by the closely spaced bar elements because the sensitive digitizer 46 will pick up the small bumps in the analog signal. The high resolution second channel will produce a pulse train output from digitizer 46, as shown in FIG. 4A, more closely corresponding to the bar code edges.

FIG. 4B shows a low resolution bar code of the dot matrix type and the signals produced in the circuit of FIG. 4 by scanning of such a bar code. The analog signal varies with the averaging of the reflected light, and as conditioned, will have small fluctuations corresponding to dots of the matrix. The analog signal will have larger fluctuations corresponding to the actual elements of the symbol. The low threshold in the first digitizer 45 will cause smaller fluctuations of the analog signal to go undetected, as shown by the pulse signal from digitizer 45, in FIG. 4B. The low resolution first channel will produce a pulse train output from digitizer 45 closely corresponding to the bar code edges. In contrast, the second channel, with its high resolution, will detect the small variations in the reflected light caused by the spaced dots within the bar elements because the sensitive digitizer 46 will pick up the small bumps in the analog signal. The pulse signal from digitizer 46, as shown in FIG. 4B, will not correspond to the actual edges of the bar elements.

It should be apparent from FIGS. 4A and 4B that for either high resolution bar code or low resolution bar code, one of the two channels will produce a pulse signal output or data steam closely corresponding to the edges of the scanned bar code. The decoder 47 is a relatively standard unit, with the exception that it has a two inputs, instead of one, for the two data steams for the two different resolution channels. The integrated decoder 47 provides a digital data output, for example in ASCII format. The specific decoding will be discussed in more detail later, particularly with respect to FIGS. 16 and 17.

A wide variety of techniques can be used for deriving the two data channels. A number of more sophisticated alternatives appear in the drawings. In each embodiment, however, the system provides two data steams from the two different resolution channels to the single decoder 47. The decoder 47 remains the same.

Figure 5:
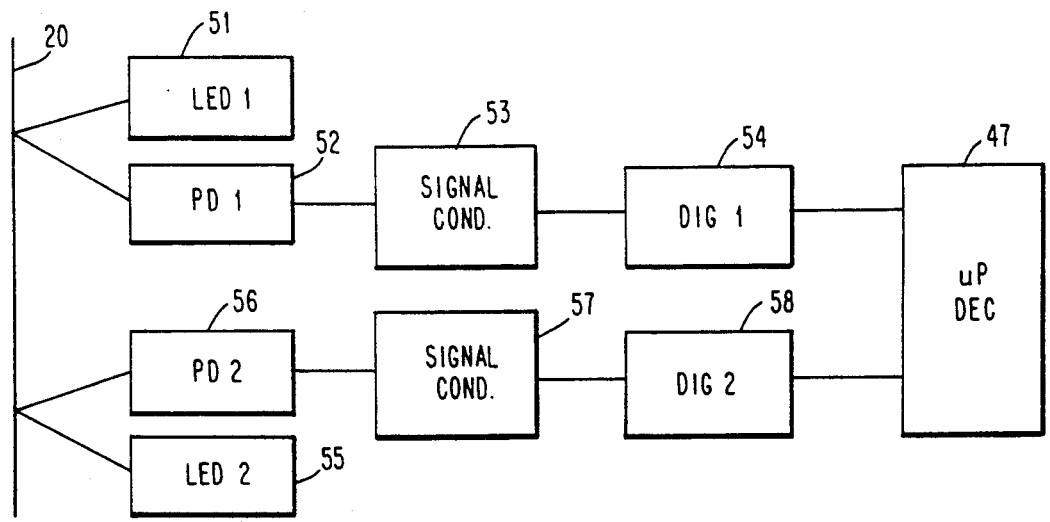
FIG. 5 shows a block circuit diagram of a second embodiment of the invention which uses two emitters and two photodetectors.

The embodiment of FIG. 5, for example, produces two different channel optically, This embodiment includes two emitters and two detectors. A first LED 51 emits light which illuminates a spot on the bar code 20. The light emitted from LED 51 is reflected back by the bar code and detected by a first PD 52. A signal conditioning circuit 53 and first digitizer 54 provide a low resolution data stream for output as a pulse train signal to decoder 47. A second LED 55 emits light which illuminates a second spot on the bar code 20. The light emitted from LED 55 is reflected back by the bar code and detected by a second PD 56. A second signal conditioning circuit 57 and second digitizer 58 provide a low resolution data stream for output as a pulse train signal to decoder 47.

As illustrated in FIG. 5, emitters and detectors are arranged so that the two spots are slightly spaced apart. This is called spatial multiplexing. If it were desired to have the two be concentric, other forms of multiplexing could be used. For example, LED's 51 and 55 could emit different wavelengths of light, and the associated PD's 52 and 56 would be designed and/or have associated light filters so as to detect only the light from the corresponding detector.

LED 51, PD 52, signal conditioning circuit 53 and digitizer 54 form the low resolution channel. LED 55, PD 56, signal conditioning circuit 57 and digitizer 58 form the high resolution channel. In this embodiment, the resolution and spot size of each channel is set by the characteristics of the LED, the PD, the associated optics, or any apertures associated therewith. For example, optics can focus light from each LED to form a different size illuminated spot and/or at a different distance form the tip of the wand. Alternately, the size of the PD's can vary or each can have a different aperture to establish a different area over which to average the reflected light. The digitizers 54 and 58 may have the same threshold value, but preferably, the thresholds are set to correspond to the characteristics of the LED's, PD's and optics of their respective channel.

Figure 6:
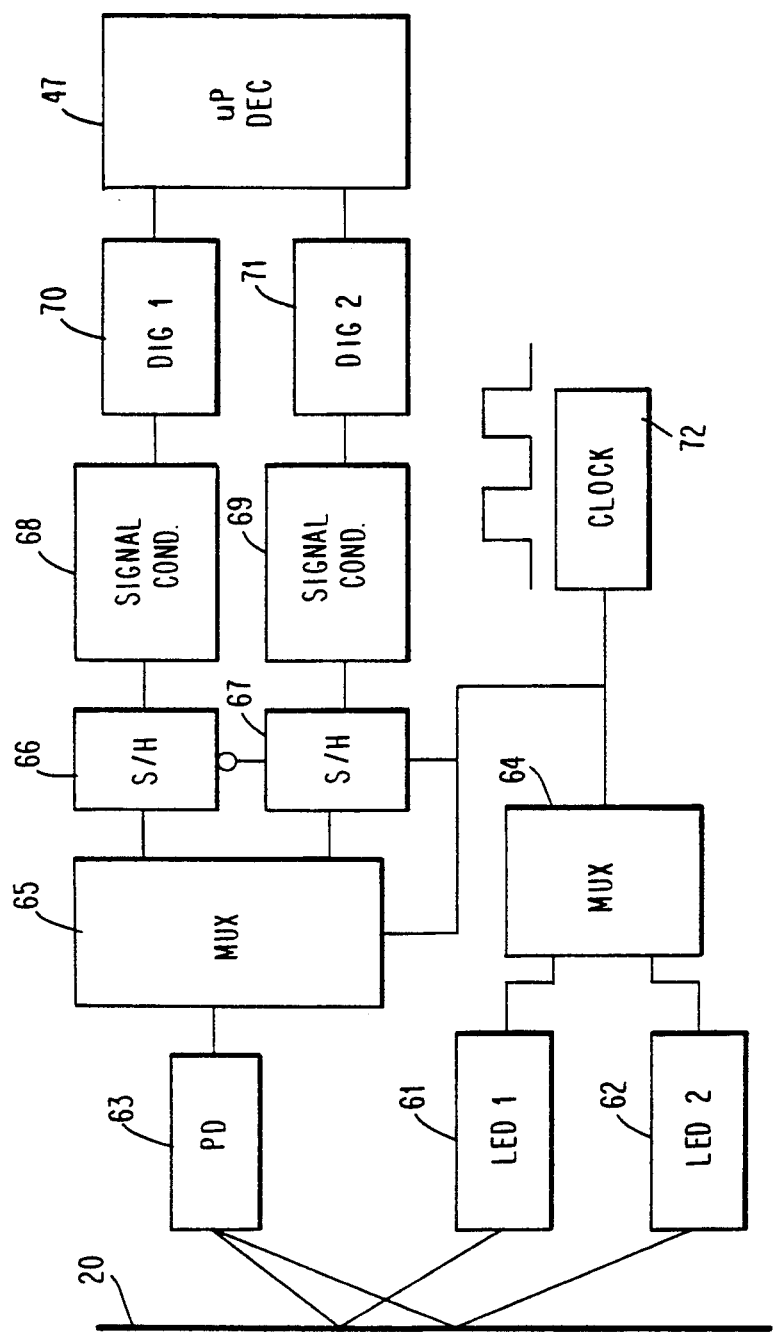
FIG. 6 shows a block circuit diagram of a third embodiment of the invention which uses two emitters, one photodetector and a multiplexer.

The embodiment of FIG. 6 uses two emitters and one detector. The output of the detector is multiplexed in synchronism with pulsing of the individual emitters to produce the two channels. The emitters and/or the associated optics differ to provide the two different effective sensing spots and the two different resolutions. The two spots can be closely aligned or substantially concentric on the surface of the optical information 20. The high and low resolution signals are time division multiplexed by the pulsing of the individual LED's.

The third embodiment includes two LED's 61 and 62, but only one PD 63. A multiplexer 64 alternately activates LED's 61 and 62. A multiplexer 65 alternately provides the output of PD 63 to one of two sample and hold (S/H) circuits 66 and 67. The signal conditioning circuit 68 and digitizer 70 provide the pulse signal for the low resolution channel to the decoder 47. The signal conditioning circuit 69 and digitizer 71 provide the pulse signal for the high resolution channel to the decoder 47. A clock 72 provides the appropriate timing signals to the two multiplexers 64 and 65 and the S/H circuits 66 and 67. Multiplexing can also be performed by rapidly pulsing the two LED's at two different frequencies and performing frequency demodulation.

The LED 61 and its associated optics are designed to provide a relatively large illuminated spot, and the LED 62 and its associated optics are designed to provide a relatively small illuminated spot. The signal from clock 72 drives the multiplexer 64 to trigger LED 61 and multiplexer 65 to provide the signal from PD 63 to S/H circuit 66. S/H circuit 66 holds a sample of the low resolution analog signal produced by the LED 61 and PD 63. The signal from clock 72 then drives the multiplexer 64 to trigger LED 62 and multiplexer 65 to provide the signal from PD 63 to S/H circuit 67. S/H circuit 67 holds a sample of the high resolution analog signal produced by the LED 62 and PD 63. As this cycle repeats the S/H circuits 66 and 67 will successively hold samples of the two different resolution analog signals The conditioning circuits and digitizers will then provide the two differing resolution data streams to the decoder 47. The signal conditioning circuits 68 and 69 and the digitizers 70 and 71 correspond closely to those of the preceding embodiment.

FIGS. 7 to 11 illustrate the preferred embodiment of the optics of the improved reader, particularly when the reader is constructed in the form of a wand type device. These optics for the dual-channel wand reader, as illustrated in FIGS. 7 to 11, form a three axes anamorphic system constructed by combining two half-axicons. In this design, two LEDs and one detector are used with the LEDs working alternately, as in the circuit embodiment of FIG. 6.

Figure 7:
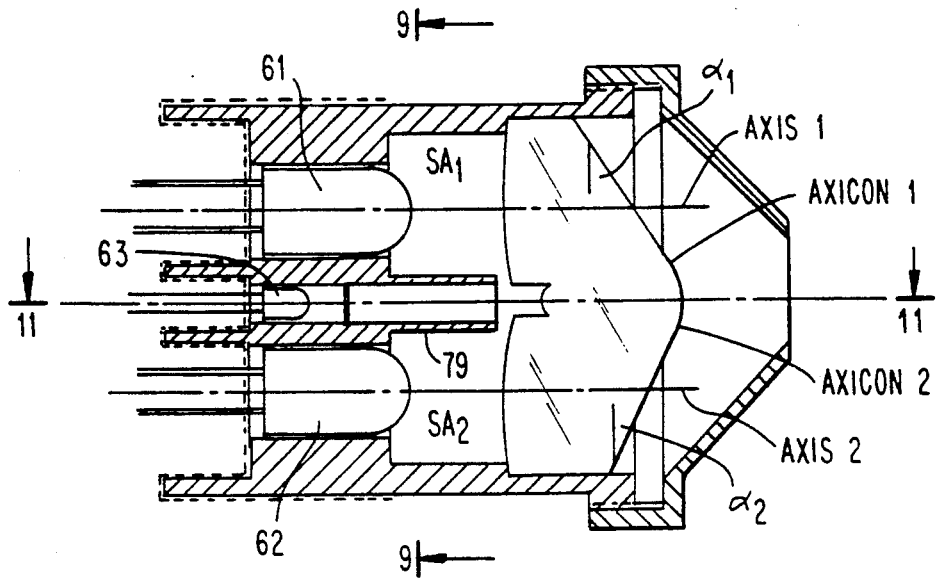
FIG. 7 illustrates the optical sensing assembly of the invention in cross section.
Figure 8:
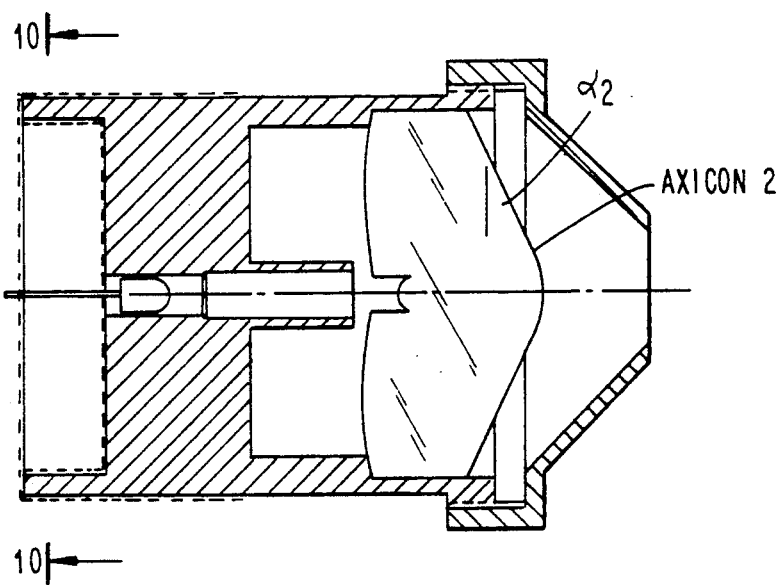
FIG. 8 is a sectional view of the optical sensing assembly of the invention taken along line C—C of FIG. 7.

The optical sensing assembly of FIGS. 7 to 11 includes a first LED 61 and a second LED 62. These two light emitting elements are arranged in assembly housing 75 to emitting light along a first and a second optical axis, respectively. That is to say, LED 61 emits light along Axis 1, and LED 62 emits light along Axis 2, as shown in FIG. 7. The optical sensing element PD 63 detects reflected light from the two LED's 61 and 62. PD 63 is located in the housing 79 to receive reflected light along the central axis of the assembly, Axis 3. Axis 3 is parallel to the first and second optical axes, Axis 1 and Axis 2. The assembly also includes an injection molded plastic optical element 77. The optical element 77 comprises first and second half-axicons, labeled Axicon 1 and Axicon 2 in FIG. 7. Axicon 1 is aligned with the LED 61 along Axis 1. Axicon 2 is aligned with the LED 62 along Axis 2.

The first half-axicon optical element, Axicon 1, establishes depth of field and spot size for light emitted by LED 61 and received by PD 63. Similarly, the second half-axicon optical element, Axicon 2, establishes depth of field and spot size for light alternately emitted by LED 62 and received by PD 63. The two half-axicons, however, may be different so that each establishes a different depth of field and spot size to provide the two different resolutions for the two channels.

Figure 11:
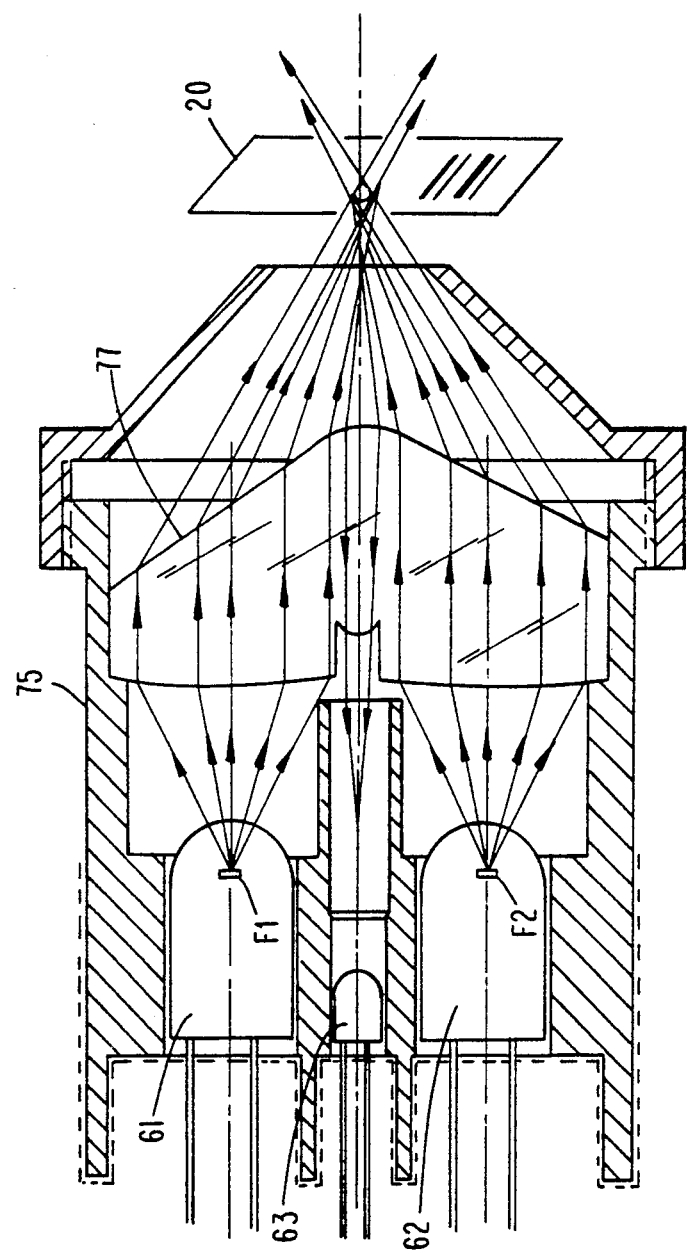
FIG. 11 shows a cross section of the optical sensing assembly of the invention, similar to FIG. 4, but also showing light rays emitted by the LED's to illuminate a bar code symbol.

Each half-axicon has a spherical rear surface and a front surface formed at a specified axicon angle $\alpha$. Axicon 1 has a rear surface SA1 of a curvature to form a focal point at F1 (FIG. 11). Axicon 2 has a rear surface SA2 of a curvature to form a second focal point at F2 (FIG. 11) The LED's 61 and 62 are located at the focal points F1 and F2, respectively.

As shown in FIG. 7, the axicon angle of each half-axicon is defined as the angle between the front surface of the half-axicon and a perpendicular to the three axes of the system. To provide the differing spot size and depth of field, Axicon 1 and Axicon 2 have different axicon angles ($\alpha_1 \neq \alpha_2$). Emitted light rays diverging from the LED's 61 and 62 are refracted into parallel rays and focused onto the bar code by Axicon 1 and Axicon 2 (FIG. 11).

Figure 9:
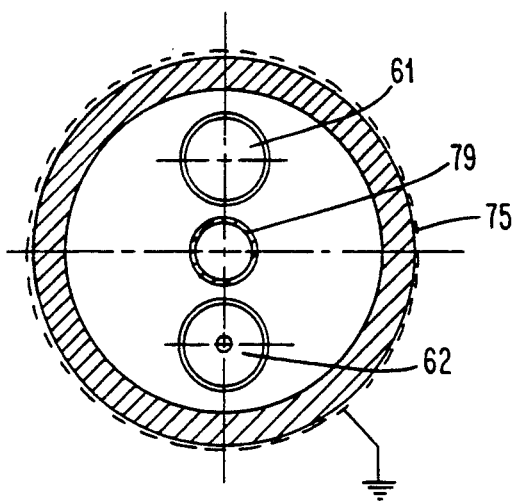
FIG. 9 is a sectional view of the optical sensing assembly of the invention taken along line A—A of FIG. 7.
Figure 10:
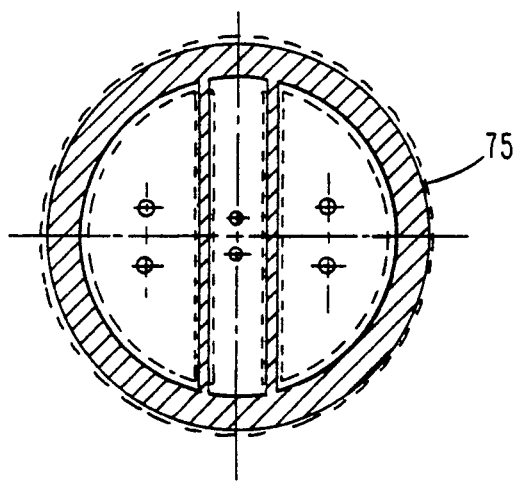
FIG. 10 is a sectional view of the optical sensing assembly of the invention taken along line B—B of FIG. 7.

The housing 75 also includes a sleeve 79 extending from the back wall of the housing in front of PD 63. Sleeve 79 blocks light emitted from the LED's 61 and 62 reflected off the back surfaces SA1 and SA2 from impinging on PD 63 and producing interference with the sensing of the reflections from the bar code. The sleeve 79 is concentric about Axis 3 (FIG. 9). The back wall of the housing 75 also includes a number of apertures to allow passage of the leads from the LED's 61 and 62 and PD 63 (FIG. 10).

Figure 18:
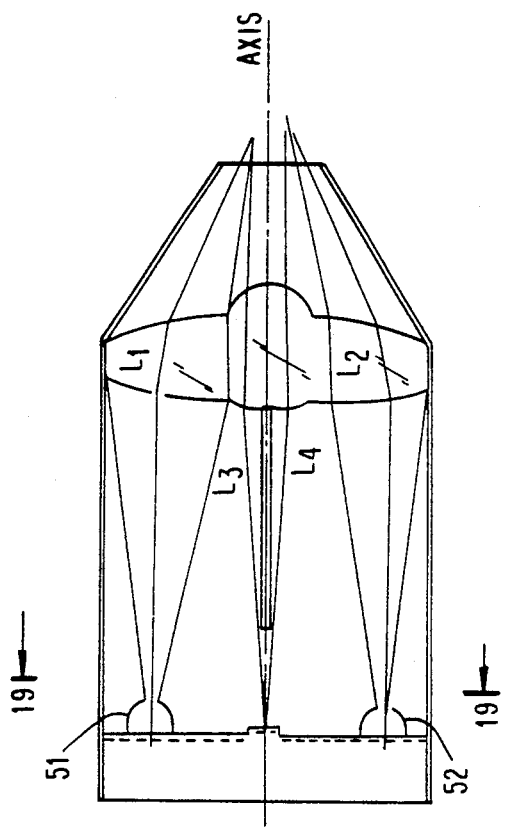
FIG. 18 shows a sectional view of an alternative optical sensing assembly, for use in the embodiment of FIG. 5.
Figure 19:
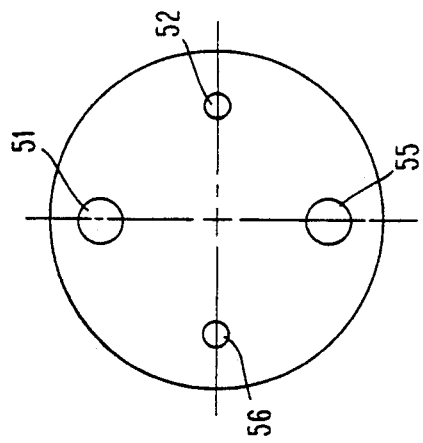
FIG. 19 is a cross sectional view of the second embodiment of the optical sensing assembly taken along line D—D of FIG. 18.

An alternative lens array for the two-channel wand head might use two LED's 51 and 55 and two photodetectors 52 and 56, as shown in FIG. 18. The optical sensing assembly of FIG. 18 would be used with the circuitry illustrated in FIG. 5. The lights from the two LEDs 51 and 55 are focused by two aspherical lenses $L_1$ and $L_2$ onto the same target. Lights reflected from the target are collected by lenses $L_3$ and $L_4$ and focused onto the photodetectors 52 and 56, for conversion to analog electrical signals. The difference between lenses $L_1$ and $L_2$ are their spherical aberrations which are used to control the intensity, depth and surface coverage of illumination.

Figure 20:
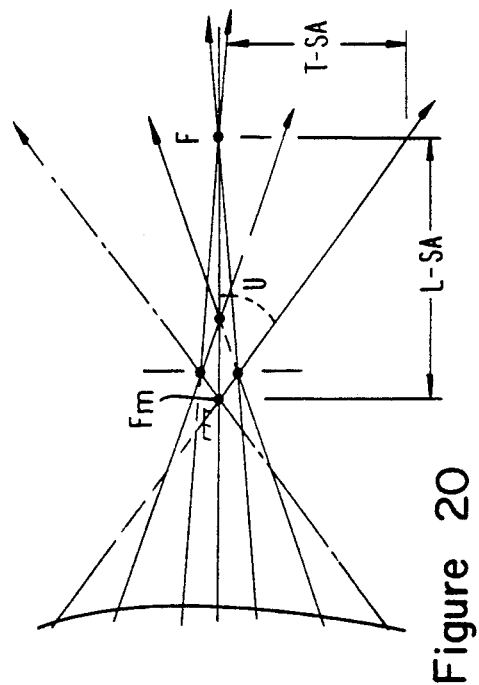
FIG. 20 illustrates the spherical aberration and focal length of a lens used in the optical sensing assembly of FIG. 18.

The spherical aberration, or SA, corresponds to a dependence of focal length on the height of incident rays, as shown in FIG. 20 in which F is the focal point of paraxial rays, and $F_m$ is the axial intersection of the marginal rays. Between these two points is the longitudinal spherical aberration $L.SA = FF_m$. This spherical aberration has the effect of increasing the depth of field. In the transverse direction, we have an extended image. The radius of this image is called the transverse spherical aberration, or T.SA, given by $$T.SA = L.SA \times \tan U.$$

The two lenses $L_1$ and $L_2$ have L.SA~2 mm and T.SA~5 mil and 20 mil, respectively, and, as a consequence, the radii of the clear apertures for the two lenses are different in order to obtain different values of the angle U in the above equation.

Figure 12:
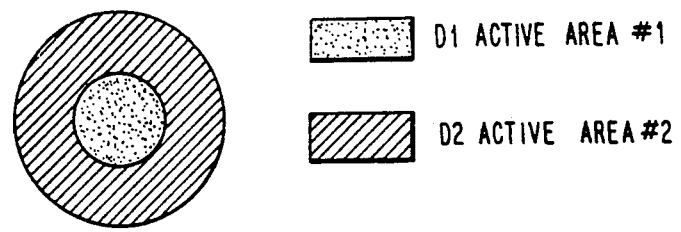
FIG. 12 is a simplified plan view of a photodetector having two active areas, one surrounding the other.

FIG. 12 is a simplified plan view of a photodetector having two active areas, one surrounding the other, with Active area #1 shown as a shaded central circle and Active area #2 shown as a cross-hatched surrounding area. The structure of the photodetector of this embodiment will be discussed in more below with regard to FIGS. 14 and 15. The salient feature of the photodetector is that it inherently forms a multi-channel detection system. This multi-channel photodetector comprises a first active optical sensing area on a substrate and a second active optical sensing area formed on the same substrate. The second optical sensing area is located around said first optical sensing area. Each active optical sensing area, together with the underlying substrate forms, a photodiode. The photodetector is used in the embodiment of the invention shown in FIG. 13.

Figure 13:
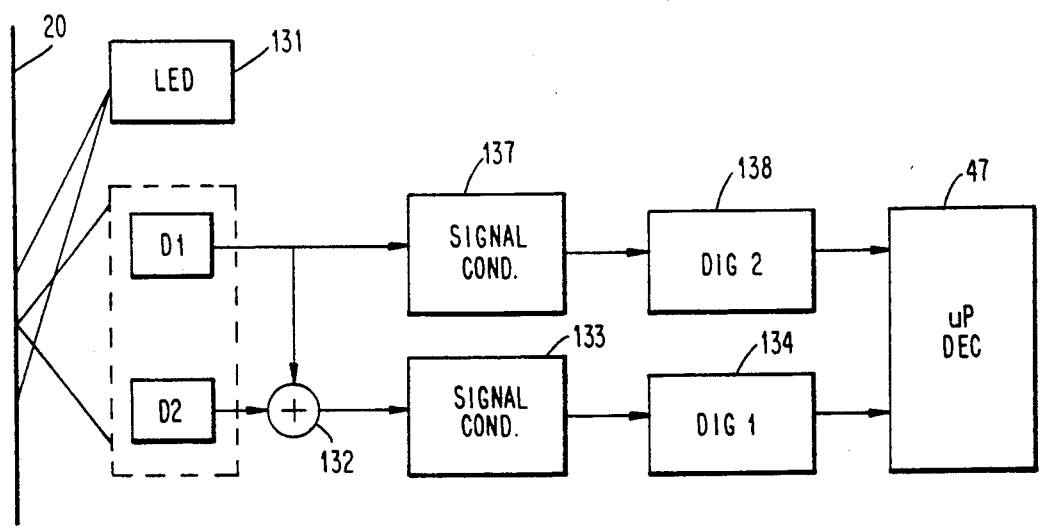
FIG. 13 shows a block circuit diagram of a fourth embodiment of the invention which uses one emitter and the two active area type photodetector of FIG. 12.

In the circuit of FIG. 13, the signal conditioning circuits and the digitizers function in a manner similar to those in the embodiments of FIGS. 5 and 6. The only difference is that FIG. 13 shows the high resolution channel, including the second digitizer, as the upper channel and the first channel as the lower channel.

In this embodiment, there is one light emitting element and two photodetectors, and the photodetectors comprise the active sensing areas of the unit shown in FIG. 12. In FIG. 13, D1 represents the sensor or photodetector including Active area #1, the central active area. D2 represents the sensor or photodetector including Active area #1, the surrounding active area. The LED 131 emits light to illuminate the optically encoded information. The photodetectors D1 and D2 receive light reflected from the surface of bar code 20.

Detector D1 will produce an analog signal which effectively represents the average of reflected light received over the small Active area D1. This signal would be the same as if a photodiode of a small effective area were used, and the effective area established the spot size and/or resolution of the high resolution channel.

Detector D2 will produce an analog signal which effectively represents the average of reflected light received over the larger surrounding Active area D1. The analog signals from D1 and D2 are summed by adding circuit 132. The sum of the analog signals from D1 and D2 closely approximates the signal which a larger photodiode would produce, i.e. by averaging received light over the total active area of area #1 plus area #2.

Signal conditioning circuit 133 receives the summed signal from adder 132 and conditions it as discussed above. The signal from conditioning circuit 133 is digitized by digitizer 134 to form the low resolution data stream. Detectors D1 and D2, adder 132, signal conditioning circuit 133 and first digitizer 134 thus form the low resolution first channel in this embodiment. Signal conditioning circuit 137 receives the signal from D1 and conditions it as discussed above. The signal from conditioning circuit 137 is digitized by digitizer 138 to form the high resolution data stream. Detector D1, signal conditioning circuit 137 and second digitizer 138 thus form the high resolution second channel in this embodiment. Decoder 47 receives and processes the pulse signals from digitizers 134 and 138 in the same manner as in the earlier discussed embodiments.

It is preferred that the photodetector unit of FIG. 12 be used in an optical sensing assembly similar to that shown in FIGS. 7 to 11. The photodetector unit of FIG. 12 would replace PD 63 in the optical sensing assembly. The LED's 61 and 62 in the assembly would be on at the same time so that they would appear as a single light source to the photodetector unit. Also, the half-axicons, Axicon 1 and Axicon 2, would have the same axicon angle ($\alpha_1 = \alpha_2$). The size of the active areas would then determine the resolution and spot size of the two channels.

It would be a simple matter to increase the number of channels of different resolutions derived using the photodetector unit of FIG. 12 by adding additional surrounding areas and corresponding adders, signal conditioning circuits and digitizers. Alternatively, two active areas could be used and the two LED's in the sensing assembly pulsed, in a manner similar to that of the circuit of FIG. 6.

The photodetector unit of FIG. 12 would be fabricated using relatively standard photodiode manufacturing technology In particular, the manufacturing processes are similar to those used to build side by side photodiodes and quad four photodiode type devices. Inactive areas or dead zones between active devices typically range in size from 0.001 to 0.005 Possible layouts for the photodetector unit of FIG. 12 appear in FIGS. 14 and 15.

Figure 14:
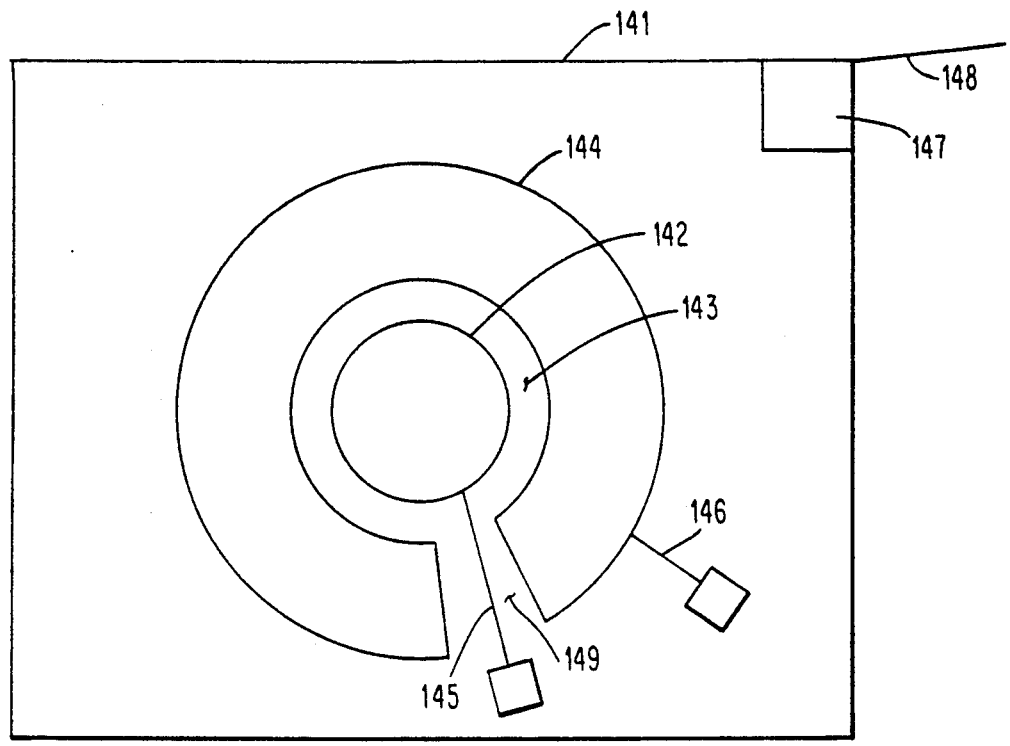
FIGS. 14 and 15 are more detailed views of the photodetector of FIG. 12.

The embodiment of FIG. 14 includes a substrate 141 on which the active areas are formed. The first active area 142 is circular. The first active region 142 is formed by appropriately doping the circular region. A dead zone 143 surrounds the active area 142. The second active area 144 forms a substantially circular ring around the first active area 142 and dead zone 143. The second active region 144 is formed by appropriately doping the circular ring. The dead zone 143 separates and electrically isolates active areas 142 and 144. A common lead 148 is attached to substrate 141 by bonding pad 147. Together with the underlying substrate, each of the active regions 142 and 144 forms a photo sensitive diode.

FIG. 14 illustrates the preferred form of connection to the first active area 142. In this embodiment, the second active area 144 does not form a complete ring around the first active area 142. A small inactive area 149 forms an insulating passage through the ring formed by the second active area 144. A metal trace 145 formed on the small inactive area 149 connects the first active area to a bonding pad. Current carrying connection to the first active area can then be formed through the bonding pad and the metal trace 145. A metal trace 146 similarly connects second active area 144 to a bonding pad. Only a 2 mil wide path through the second active area 144 is lost to formation of the passage 149 and trace 145.

Figure 15:
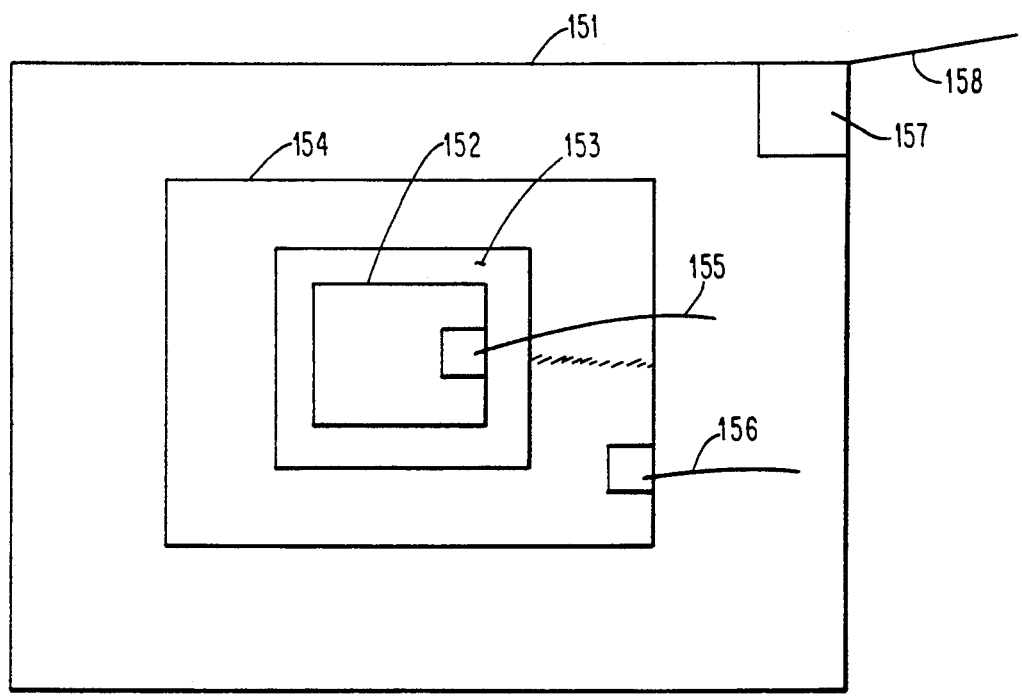

FIG. 15 illustrates a second embodiment of the inventive photodetector unit, having rectangular active areas a using a bonding pad formed directly on each of the active areas. This embodiment includes a substrate 151 on which the active areas are formed. The first active area 152 is rectangular, and the first active region 152 is formed by appropriately doping the rectangular region. A rectangular dead zone 153 is formed around the active area 152. The second rectangular active area 154 completely encloses the first active area 152 and dead zone 153. The second active region 154 is formed by appropriately doping the outer rectangular ring. The dead zone 153 separates and electrically isolates active areas 152 and 154. A common lead 158 is attached to substrate 151 by bonding pad 157. Together with the underlying substrate, each of the active regions 152 and 154 forms a photo sensitive diode.

FIG. 15 illustrates a second form of connection to the active areas. In this embodiment, a bonding pad is formed directly on each active area. A metal lead 155 provides current carrying connection to the first active area 152 through the bonding pad on that area, and a second metal lead 156 provides a similar connection through the bonding pad on the second active area 154. In each active area a portion of the area is sacrificed to formation of the bonding pads. Also, the lead 155 will cast a shadow across the second active area 154, as shown in FIG. 15.

The discussion of the improved photodetector unit of FIGS. 12 to 15 has concentrated on the preferred embodiment wherein the active areas form photodiodes on a substrate, but other active area type photodetector devices could be used. For example, it is contemplated that the photodetector unit could comprise areas within a two dimensional charge coupled device (CCD) array. The central area would comprise a number of pixel sensing units of the array, for example, in the form of a 2×2 square sub-array. The surrounding active area would comprise a number of pixel sensing units of the area around the central active area, for example, forming a 2 pixel wide ring around the square central active area. The signal from the central area would be formed by shifting out the charge value of each pixel of the 2×2 square sub-array and averaging the values over the number of pixels of the central area. The signal from the surrounding area could be formed in a similar manner, or the summation signal could be formed directly by averaging values over both areas together.

Figure 16:
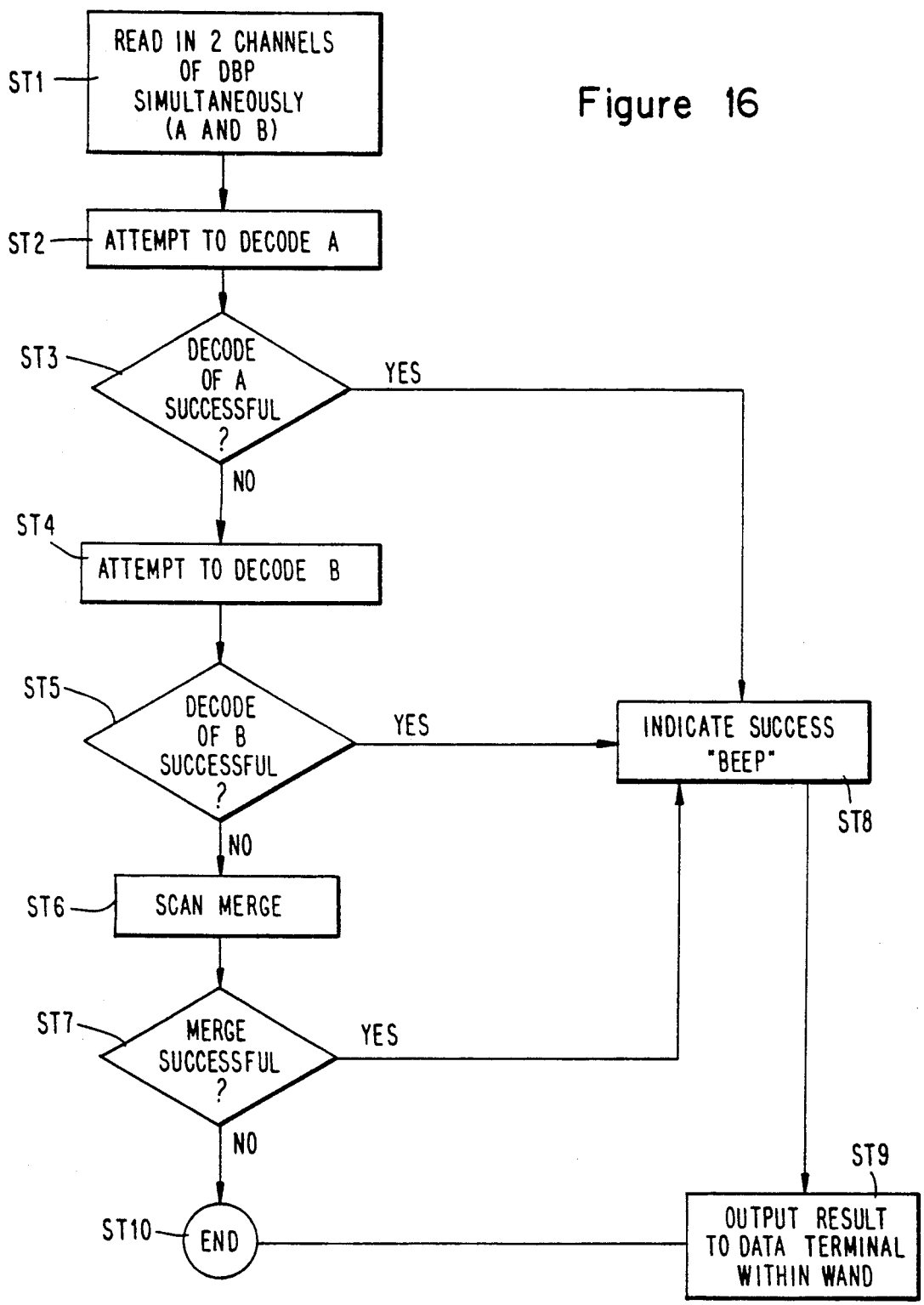
FIG. 16 is a flow chart illustrating the process by which the decoder derives a single legitimate result from the two data streams of differing resolution.

FIG. 16 is a flow chart illustrating the process by which the decoder 47 derives a single legitimate result from the two data streams of differing resolution. In first step ST1 the data from both of the channels is read into the decoder 47 simultaneously. The data from the two channels will be referred to as data A and data B. One of these data inputs arbitrarily corresponds to the low resolution data stream and the other corresponds to the high resolution data stream. In step ST2, the decoder attempts to decode data A. In step ST3 the decoder determines if the attempt to decode data A was successful. If successful, the process flow proceeds to step ST8 to provide a "beep" to indicate successful scanning followed by step ST9 which provides an output of the decoded data to a terminal which may be incorporated in the wand (not shown), and then the program ends at step ST10. If, however, step ST3 found that the attempt to decode data A was unsuccessful, the decoder proceeds to attempt to decode data B in step ST4. In step ST5 the decoder determines if the attempt to decode data B was successful. If successful, the process flow again proceeds to step ST8 to indicate successful scanning followed by step ST9 which provides the output of the decoded data to the terminal, and then the program ends at step ST10. If, however, step ST5 found that the attempt to decode data B was unsuccessful, the decoder proceeds to execute a scan merge algorithm in step ST6.

Figure 17:
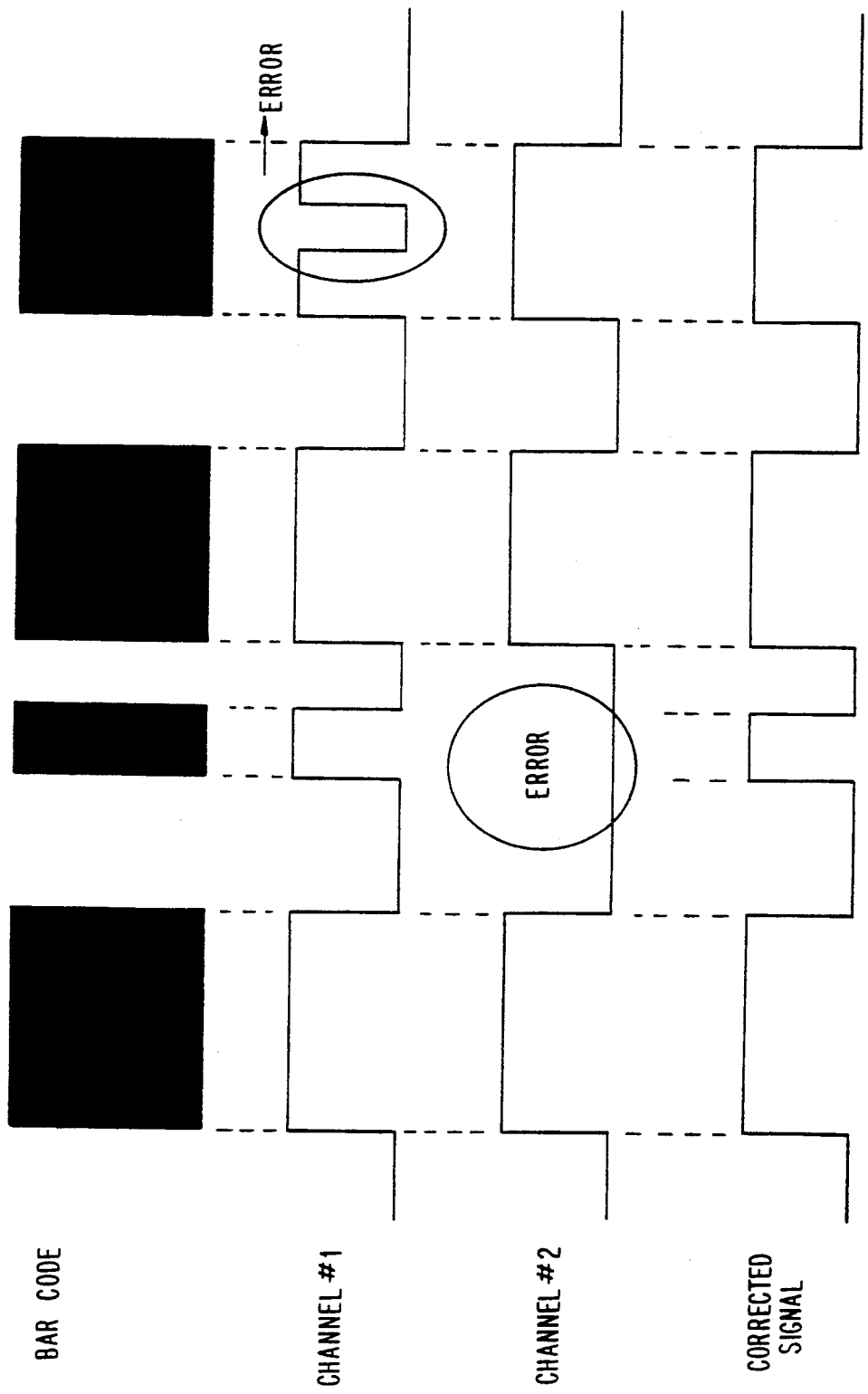
FIG. 17 illustrates an enlarged bar code and the signals derived in the two channels for processing in the scan merge algorithm.

FIG. 17 helps to illustrate the scan merge algorithm. As shown, channel #1 produces a pulse signal from its digitizer which includes one error. Several sections of the signal, however, indicate data within acceptable limits for the particular bar code standard. Similarly, channel #2 produces a pulse signal from its digitizer which includes one error and several sections of the signal which indicate data within acceptable limits. The error included in the channel #1 data is at a different position from the error in the channel #2 data. The microprocessor decoder recognizes which portions of the data from each channel are within acceptable parameters. The microprocessor decoder discards the error data from the two channels, and combines the acceptable portions of the data from the two channels to form the single final valid read result shown as the corrected signal in FIG. 17. Thus, even if both channels produce data that can not be successfully decoded, the microprocessor can merge the data from the two channels to produce a single valid result.

The scan merge algorithm is similar to the processing disclosed in commonly assigned U.S. patent application 07/421,269, filed Dec. 6, 1989 entitled "Method and Apparatus for Decoding Bar Codes From Multiple Scans" which is herein incorporated by reference. That prior application describes the analysis of scanning signals to determine legitimate data, for decoding and merger of data from sequential scans. The scan merge algorithm in this case is similar but adapted to process scanning data received form two different resolution channels simultaneously.

Returning to FIG. 16, after execution of the scan merge algorithm at step ST6, the decoder determines whether the scan merge produced a successful decoding. If successful, the process flow again proceeds to step ST8 to indicate successful scanning followed by step ST9 which provides the output of the decoded data, and then the program ends at step ST10. Only if the scan merge also fails to provide a legitimate successful decoded result will the program end at ST10 without an output of valid decoded data.

The above discussion of the software is simplified and limited to focus on the processing of the data from the two channels to provide the decoded result. The decoder would also include appropriate software to allow autodiscrimination of different code symbologies and to find the actual code data within an analog scanning signal which includes pulses representing light reflected from other objects.

The microprocessor decoder may also include programming for functions related to integrated terminal operations. The terminal typically would include substantial memory capacity, a keyboard, a display and some form of data interface for communication purposes. In such an integrated terminal configuration, the microprocessor would respond to keyboard input of data and commands, provide display of scanned and keyed in data and control transmission of data to external data processing systems.

The invention has been described principally as a two channel system. It is within the scope of this invention to expand the various embodiments to include additional data channels providing still further different resolutions.

What is claimed is:

1. A method of increasing a range of a working angle of a wand type reader during reading of optically encoded information, wherein the working angle is defined as the angle between a major axis of the wand type reader and a line normal to a surface on which the optically encoded information appears, said method comprising the steps of:

(a) arranging light emitting and detecting elements in the wand to
  (i) optically sense light reflected from a first effective sensing spot of a first diameter, and simultaneously
  (ii) optically sense light reflected from a second effective sensing spot of a second diameter which is different from the first diameter;
(b) passing the first and second effective sensing spots over the optically encoded information for simultaneously:
  (i) sensing the optically encoded information as it passes through the first effective sensing spot and in response thereto producing a sensing signal, and
  (ii) sensing the optically encoded information as it passes through the second effective sensing spot and in response thereto producing another sensing signal,
  wherein the diameters of the first and second effective sensing spots increase in proportion to increases in the working angle; and
(c) deriving a single decoded representation of the optically encoded information from the two sensing signals, wherein for different working angles at least one of the effective sensing spots will be of appropriate size to produce a valid reading of the optically encoded information.

2. A method as specified in claim 1, further comprising the step of supplying the resultant decoded representation of the optically encoded information to a data terminal incorporated within the wand.

3. A method as specified in claim 1, wherein the arranging step comprises:
  emitting a first light focused to illuminate an area of a first size;
  emitting a second light focused to illuminate an area of a second size different from the size of the first area; and
  sensing the light reflected from both areas to provide the sensing of the first and two effective sensing spots.

4. A method as specified in claim 1, wherein the arranging step comprises:
  emitting light to illuminate an area on the surface of the medium;
  sensing light reflected from a first area passed over the optically encoded information, said first area having a first size; and
  sensing light reflected from a second area passed over the optically encoded information, said second area having a second size larger than the size of said first area to provide the sensing of the first and second effective sensing spots.

5. A method as specified in claim 1, wherein the deriving step comprises:
  attempting to decode one of the two sensing signals, wherein if the attempt to decode produces legitimate data, the data constitutes the decoded representation of the optically encoded information; and
  if the attempt to decode one of the two sensing signals did not produce legitimate data, attempting to decode the other one of the two sensing signals, wherein if the attempt to decode the other one of the two sensing signals produces legitimate data, the data decoded from the other one of the two sensing signals constitutes the decoded representation of the optically encoded information.

6. A method as specified in claim 5, wherein if both attempts to decode data from the two sensing signals did not produce legitimate data, the deriving step further comprises:
  analyzing said one of the two sensing signals to recognize and decode any portions thereof which represent information within acceptable parameters;
  analyzing said other one of the two sensing signals to recognize and decode any portions thereof which represent information within acceptable parameters; and
  combining the recognized and decoded portions of both sensing signals to produce the single decoded representation of the optically encoded information.

7. A wand type reader for reading optically encoded information at a wide range of a working angle, wherein the working angle is defined as the angle between a major axis of the wand type reader and a line normal to a surface on which the optically encoded information appears, said wand type reader comprising:
(a) light emitting and detecting elements arranged in the wand to
  (i) optically sense light reflected from a first effective sensing spot of a first diameter for sensing the optically encoded information as it passes through the first effective sensing spot and in response thereto producing a sensing signal, and simultaneously
  (ii) optically sense light reflected from a second effective sensing spot of a second diameter which is different from the first diameter for sensing the optically encoded information as it passes through the second effective sensing spot and in response thereto producing another sensing signal,
  wherein the diameters of the first and second effective sensing spots increase in proportion to increases in the working angle; and
(b) means for deriving a single decoded representation of the optically encoded information from the two sensing signals, wherein for different working angles at least one of the effective sensing spots will be of appropriate size to produce a valid reading of the optically encoded information.

8. A wand type reader as specified in claim 7, further comprising a data terminal incorporated within the wand, wherein the data terminal receives the resultant decoded representation of the optically encoded information from the means for deriving.

9. A method of reading optically encoded information comprising the steps of:
  optically exposing encoded information;
  sensing light reflected from the optically encoded information to simultaneously produce two data streams related to the optically encoded information, wherein said two data streams have respectively two different resolutions; and
  deriving a single decoded representation of the optically encoded information from the two data streams of different resolutions.

10. A method of reading optically encoded information as in claim 9,
  wherein the sensing step comprises:

(i) digitizing a signal produced by detecting the reflected light using a first digitizer threshold level; and (ii) digitizing said signal produced by detecting the reflected light using a second digitizer threshold level different from said first digitizer threshold level, and wherein the deriving step is responsive to results of (i) and (ii).

11. A method of reading optically encoded information as in claim 9, wherein the exposing step comprises (i) emitting a first light focused to illuminate an area of a first size;

(ii) emitting a second light focused to illuminate an area of a second size different from the size of the first area; and (iii) passing both illuminated areas over the optically encoded information, and wherein the sensing step separately senses the light reflected from both areas as those areas pass over the optically encoded information.

12. A method of reading optically encoded information as in claim 9, wherein the sensing step comprises sensing light reflected from a first area passed over the optically encoded information, said first area having a first size; and sensing light reflected from a second area passed over the optically encoded information, said second area having a second size different the size of said first area.

13. A method of reading optically encoded information as in claim 9, wherein the deriving step comprises:

attempting to decode one of the data streams;

if the the attempt to decode is successful, utilizing the data decoded from the one data stream as the decoded representation of the optically encoded information;

if the attempt to decode the one data stream is unsuccessful, attempting to decode the other one of the data streams; and if the attempt to decode the other one of the data streams is successful, utilizing the data decoded from the other one of the data streams as the decoded representation of the optically encoded information.

14. A method of reading optically encoded information as in claim 13, wherein if the attempts to decode both of the data streams were unsuccessful, the deriving step further comprises:

analyzing said one of the data streams to recognize and decode any portions thereof which represent information within acceptable parameters;

analyzing said other one of the data streams to recognize and decode any portions thereof which represent information within acceptable parameters; and combining the recognized and decoded portions of both data streams to produce a single decoded representation of the optically encoded information.

15. The method of claim 9, wherein the deriving step comprises successively attempting to decode each of the two data streams and utilizing the first data stream for which a decode attempt is successful as the single decoded representation of the optically encoded information.

16. A system for reading optically encoded information comprising:

sensor means for optically sensing the encoded information, and in response thereto, producing at least one electrical signal corresponding to the sensed optically encoded information;

means responsive to said at least one electrical signal for simultaneously deriving two channels of data for each scan or pass of the encoded information by the sensor means, the two channels of data having respectively two different resolutions, one resolution being higher than the other resolution; and a decoder responsive to both channels of derived data for producing a single data output representative of the sensed optically encoded information.

17. A system for reading optically encoded information as in claim 16, wherein said sensor means comprises:

at least one light source for emitting light for reflection back form the optically encoded information; and at least one sensor for detecting the reflected light and producing at least one electrical signal corresponding to the sensed reflected light.

18. A system for reading optically encoded information as in claim 17, wherein said at least one light source comprises only one light source.

19. A system for reading optically encoded information as in claim 18, wherein said at least one sensor comprises only one sensor.

20. A system for reading optically encoded information as in claim 19, wherein said means for deriving two channels of data comprise two digitizers.

21. A system for reading optically encoded information as in claim 20, wherein said digitizers are responsive to a single electrical signal from said one sensor, and said digitizers have respectively different threshold levels to establish the two different resolutions.

22. A system for reading optically encoded information as in claim 17, wherein said at least one sensor comprises only one sensor.

23. A system for reading optically encoded information as in claim 17, wherein said at least one light source comprises two light sources.

24. A system for reading optically encoded information as in claim 23, wherein said at least one sensor comprises two sensors.

25. A system for reading optically encoded information as in claim 17, wherein said at least one sensor comprises two sensors.

26. A system for reading optically encoded information as in claim 17, further comprising a housing, in the form of a wand, the housing containing said at least one light source and said at least one sensor.

27. A system for reading optically encoded information as in claim 16, wherein said means for deriving two channels of data comprise two digitizers.

28. A system for reading optically encoded information as in claim 27, wherein said two digitizers are both responsive to the same electrical signal but have respectively different threshold levels to establish the two different resolutions.

29. A system for reading optically encoded information as in claim 17, wherein said at least one light source comprises a first light source and a second light source, wherein operations of the first and second light sources are multiplexed in a manner such that said one sensor can separately detect reflected light emitted from each source.

30. A system for reading optically encoded information as in claim 29, wherein each of said first and second light sources illuminates a different size area.

31. A system for reading optically encoded information as in claim 16, wherein said at least one sensor comprises:
   a first active optical sensing area on a substrate; and
   a second active optical sensing area formed on said substrate such that said second optical sensing area is located around said first optical sensing area.

32. A system for reading optically encoded information as in claim 31, wherein said second active optical sensing area substantially surrounds said first active optical sensing area.

33. A system for reading optically encoded information as in claim 32, wherein said first active optical sensing area is centered inside said second active optical sensing area.

34. A system for reading optically encoded information as in claim 31, wherein said first active optical sensing area and said second active optical sensing area each comprise a photodiode.

35. A system for reading optically encoded information as in claim 31, wherein the means for deriving two channels of data comprise:
   means for digitizing a signal derived from said first optical sensing area to form the higher resolution data channel;
   means for summing the signal derived from the first optical sensing area and a signal derived from the second optical sensing area; and
   means for digitizing the output of the summing means to form the lower resolution data channel.

36. A system for reading optically encoded information as in claim 16, wherein said optically encoded information comprises bar coded information, and said decoder comprises means for decoding bar code data.

37. A system for reading optically encoded information as in claim 16, wherein said sensor means comprises an optical sensing assembly including:
   a first light emitter emitting light along a first optical axis;
   a second light emitter emitting light along a second optical axis parallel to the first optical axis;
   an optical sensing element detecting reflected light from the first and second light emitters, the optical sensing element receiving the reflected light along a third optical axis parallel to both the first and the second optical axes;
   a first half-axicon optical element aligned with first emitter along the first optical axis, whereby the first half-axicon optical element establishes depth of field and spot size for light emitted by the first light emitter and received by the optical sensing element; and
   a second half-axicon optical element aligned with the second emitter along the second optical axis, the second half-axicon optical element having at least one optical property different from the first half-axicon optical element, whereby the second half-axicon optical element establishes depth of field and spot size for light emitted by the second light emitter and received by the optical sensing element which are different from the depth of field and spot size for light emitted by the first light emitter and received by the optical sensing element.

38. A system for reading optically encoded information as in claim 16, wherein said sensor means comprises an optical sensing assembly including:
   a first light emitter emitting light along a first optical axis;
   a second light emitter emitting light along a second optical axis parallel to the first optical axis;
   an optical sensing element detecting reflected light from the first and second light emitters, the optical sensing element receiving the reflected light along a third optical axis parallel to both the first and the second optical axes, said sensing element comprising
      (i) a first active optical sensing area on a substrate; and
      (ii) a second active optical sensing area formed on said substrate such that said second optical sensing area is located around said first optical sensing area;
   a first half-axicon optical element aligned with the first emitter along the first optical axis; and
   a second half-axicon optical element aligned with the second emitter along the second optical axis.

39. The system of claim 16, wherein said decoder includes means for successively attempting to decode each of the two channels of derived data and decoding whichever channel is determined first to contain data representing legitimate information.

40. A method of increasing a range of a working angle of a wand type reader during reading of optically encoded information, wherein the working angle is defined as the angle between a major axis of the wand type reader and a line normal to a surface on which the optically encoded information appears, said method comprising the steps of:
   (a) arranging light emitting and detecting elements in the wand to
      (i) optically sense light reflected from a first effective sensing spot of a first diameter, and
      (ii) optically sense light reflected from a second effective sensing spot of a second diameter which is larger than the first diameter;
   (b) passing the first and second effective sensing spots over the optically encoded information for
      (i) sensing the optically encoded information as it passes through the first effective sensing spot and in response thereto producing a first sensing signal, and
      (ii) sensing the optically encoded information as it passes through the second effective sensing spot and in response thereto producing a second sensing signal,
   wherein the diameters of the first and second effective sensing spots increase in proportion to increases in the working angle; and
   (c) deriving a single decoded representation of the optically encoded information from the two sensing signals, wherein the different working angles at least one of the effective sensing spots will be of appropriate size to produce a valid reading of the optically encoded information, the deriving step comprising:
   attempting to decode data from one of the sensing signals;
   if the attempt to decode data from the one sensing signal is successful, utilizing the data decoded from the one sensing signal as the decoded representation of the optically encoded information;

if the attempt to decode the one sensing signal is unsuccessful, attempting to decode data from the other one of the sensing signals;

if the attempt to decode data from the other one of the sensing signals is successful, utilizing the data decoded from the other one of the sensing signals as the decoded representation of the optically encoded information; and if the both of the attempts to decode data from the sensing signals were unsuccessful,: analyzing said one of the sensing signals to recognize and decode any portions thereof which represent information within acceptable parameters, analyzing said other one of the sensing signals to recognize and decode any portions thereof which represent information within acceptable parameters, and combining the recognized and decoded portions of both sensing signals to produce the single decoded representation of the optically encoded information.

41. A method of reading optically encoded information comprising the steps of:

optically exposing encoded information;

sensing light reflected from the optically encoded information to produce two data streams related to the optically encoded information, wherein said two data streams have respectively two different resolutions; and deriving a single decoded representation of the optically encoded information from the two data streams of different resolutions by:

attempting to decode data from one of the data streams;

if the attempt to decode data from the one data stream is successful, utilizing the data decoded from the one data stream as the decoded representation of the optically encoded information;

if attempt to decode data from the one data stream was unsuccessful, attempting to decode data from the other one of the data streams;

if the attempt to decode data from the other one of the data streams is successful, utilizing the data decoded from the other one of the data streams to produce the decoded representation of the optically encoded information; and if the data derived from both of the sensing signals indicates information not within acceptable parameters: analyzing said one of the sensing signals to recognize and decode any portions thereof which represent information within acceptable parameters, analyzing said other one of the sensing signals to recognize and decode any portions thereof which represent information within acceptable parameters, and combining the recognized and decoded portions of both sensing signals to produce the single decoded representations of the optically encoded information.

42. A method of reading optically encoded information, comprising the step of:

optically exposing encoded information;

sensing light reflected from the optically encoded information to produce, simultaneously, two data streams related to the optically encoded information, wherein said two data streams have respectively two different resolutions; and successively attempting to decode each data stream and decoding whichever data stream is first determined to contain data representing legitimate information, to thereby derive a single decoded representation of the optically encoded information from the two data streams.

43. A system for reading optically encoded information, comprising:

sensor means for optically sensing the encoded information, and in response, producing at least one electrical signal corresponding to the sensed optically encoded information;

means responsive to said at least one electrical signal for simultaneously deriving two channels of data for each scan or pass of the encoded information by the sensor means, the two channels of data having respectively two different resolutions, one being greater than the other; and a decoder responsive to both channels of derived data for successively attempting to decode each channel and decoding whichever channel is first determined to contain data representing legitimate information to produce a single data output representative of the sensed optically encoded information.

* * * * *